(12) United States Patent
Gounder et al.

(10) Patent No.: US 8,858,839 B2
(45) Date of Patent: Oct. 14, 2014

(54) THERMOPLASTIC POLY(ARYLENE ETHER)/POLYAMIDE BLENDS AND METHOD OF MAKING

(71) Applicant: SABIC Innovative Plastics IP B.V., Bergen op Zoom (NL)

(72) Inventors: Shabarinath Kutti Gounder, Karnataka (IN); Roshan Kumar Jha, Bangalore (IN); Mark D. Elkovitch, Selkirk, NY (US)

(73) Assignee: SABIC Global Technologies B.V. (NL)

( * ) Notice: Subject to any disclaimer, the term of this patent is extended or adjusted under 35 U.S.C. 154(b) by 0 days.

(21) Appl. No.: 14/064,819

(22) Filed: Oct. 28, 2013

(65) Prior Publication Data

US 2014/0051794 A1 Feb. 20, 2014

Related U.S. Application Data

(63) Continuation of application No. 12/248,306, filed on Oct. 9, 2008, now abandoned.

(60) Provisional application No. 60/992,788, filed on Dec. 6, 2007.

(51) Int. Cl.
| | |
|---|---|
| H01B 1/20 | (2006.01) |
| C08L 71/08 | (2006.01) |
| C08L 77/06 | (2006.01) |
| C08L 71/12 | (2006.01) |
| C08L 53/02 | (2006.01) |

(52) U.S. Cl.
CPC .............. *C08L 71/08* (2013.01); *C08L 77/06* (2013.01); *C08L 71/126* (2013.01); *C08L 71/12* (2013.01); *C08L 53/02* (2013.01)
USPC ........... 252/500; 524/504; 524/305; 524/508; 524/514; 525/66; 525/92 B; 525/391; 525/397

(58) Field of Classification Search
CPC .............. H01B 1/20; H01B 1/22; H01B 1/24; C08L 77/00; C08L 77/02; C08L 77/04; C08L 77/06; C08L 77/08; C08L 77/10; C08L 77/12; C08L 71/02
USPC .................. 252/500; 524/504, 305, 508, 514; 525/66, 92 B, 391, 397

See application file for complete search history.

(56) References Cited

U.S. PATENT DOCUMENTS

| | | |
|---|---|---|
| 4,315,086 A | 2/1982 | Ueno et al. |
| 4,454,284 A | 6/1984 | Ueno et al. |
| 4,565,684 A | 1/1986 | Tibbetts et al. |
| 4,572,813 A | 2/1986 | Arakawa |
| 4,600,741 A | 7/1986 | Aycock et al. |
| 4,659,760 A | 4/1987 | van der Meer |
| 4,663,230 A | 5/1987 | Tennent |
| 4,732,938 A | 3/1988 | Grant et al. |
| 4,745,157 A | 5/1988 | Yates, III et al. |
| 4,772,664 A | 9/1988 | Ueda et al. |
| 4,798,865 A | 1/1989 | Grant et al. |
| 4,960,825 A | 10/1990 | van der Meer |
| 4,963,620 A | 10/1990 | Grant et al. |
| 4,994,525 A | 2/1991 | Brown et al. |
| 4,997,612 A | 3/1991 | Gianchandai et al. |
| 5,000,897 A | 3/1991 | Chambers |
| 5,024,818 A | 6/1991 | Tibbetts et al. |
| 5,104,937 A | 4/1992 | Saito et al. |
| 5,104,939 A | 4/1992 | van der Meer et al. |
| 5,109,052 A | 4/1992 | Kasai et al. |
| 5,109,065 A | 4/1992 | Saito et al. |
| 5,122,576 A | 6/1992 | White et al. |
| 5,132,365 A | 7/1992 | Gallucci |
| 5,134,196 A | 7/1992 | van der Meer |
| 5,135,983 A | 8/1992 | Morioka |
| 5,162,433 A | 11/1992 | Nishio et al. |
| 5,165,909 A | 11/1992 | Tennent et al. |
| 5,237,002 A | 8/1993 | Nishio et al. |
| 5,248,728 A | 9/1993 | Lee, Jr. |
| 5,260,359 A | 11/1993 | Muehlbach et al. |
| 5,260,374 A | 11/1993 | Gallucci |
| 5,296,533 A | 3/1994 | Nagaoka et al. |
| 5,304,593 A | 4/1994 | Nishio et al. |

(Continued)

FOREIGN PATENT DOCUMENTS

| | | |
|---|---|---|
| EP | 0574229 A1 | 12/1993 |
| EP | 1024171 A1 | 8/2000 |

(Continued)

OTHER PUBLICATIONS

European Search Report for European Application No. 08860493, Application Filing Date: Dec. 3, 2008; Report Date: Jun. 11, 2012, 5 Pages.

(Continued)

*Primary Examiner* — Douglas McGinty
(74) *Attorney, Agent, or Firm* — Cantor Colburn LLP

(57) ABSTRACT

A thermoplastic composition comprises:
a compatibilized blend of a poly(arylene ether), an aliphatic-aromatic polyamide and a polymeric compatibilizer; and
an impact modifier;
wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine.

18 Claims, 10 Drawing Sheets

(56) References Cited

U.S. PATENT DOCUMENTS

| | | | |
|---|---|---|---|
| 5,310,821 A | 5/1994 | Kodaira et al. | |
| 5,324,782 A | 6/1994 | Lee, Jr. | |
| 5,334,636 A | 8/1994 | Fujii et al. | |
| 5,397,838 A | 3/1995 | Ohtomo et al. | |
| 5,552,480 A * | 9/1996 | Sugita et al. | 525/64 |
| RE35,509 E | 5/1997 | Fujii et al. | |
| 6,887,930 B2 * | 5/2005 | Uchida et al. | 524/430 |
| 7,009,029 B2 * | 3/2006 | Oka et al. | 528/310 |
| 7,118,691 B2 * | 10/2006 | Elkovitch et al. | 252/500 |
| 7,132,063 B2 * | 11/2006 | Elkovitch et al. | 252/500 |
| 7,678,295 B2 * | 3/2010 | Elkovitch et al. | 252/500 |
| 8,092,717 B2 * | 1/2012 | Borade et al. | 252/500 |
| 8,450,412 B2 * | 5/2013 | Elkovitch et al. | 524/514 |
| 8,536,272 B2 * | 9/2013 | Borade et al. | 525/93 |
| 2003/0088027 A1 | 5/2003 | Chin et al. | |
| 2004/0144963 A1 * | 7/2004 | Braig et al. | 252/500 |
| 2005/0038171 A1 * | 2/2005 | Elkovitch et al. | 524/494 |
| 2005/0038203 A1 * | 2/2005 | Elkovitch et al. | 525/397 |
| 2006/0122310 A1 | 6/2006 | Matthijssen | |
| 2006/0205872 A1 * | 9/2006 | Elkovitch | 525/66 |
| 2007/0244231 A1 | 10/2007 | Borade et al. | |
| 2008/0051495 A1 * | 2/2008 | Murakami et al. | 524/100 |
| 2008/0274355 A1 * | 11/2008 | Hewel | 428/402 |

FOREIGN PATENT DOCUMENTS

| | | |
|---|---|---|
| EP | 1170335 A2 | 1/2002 |
| JP | 1997087483 A | 3/1997 |
| JP | 2000212433 A | 8/2000 |
| JP | 2000212434 A | 8/2000 |
| JP | 2004083792 A | 3/2004 |

OTHER PUBLICATIONS

JP2003041117, Publication Date: Feb. 13, 2003, Abstract Only, 1 Page.

* cited by examiner

US 8,858,839 B2

THERMOPLASTIC POLY(ARYLENE ETHER)/POLYAMIDE BLENDS AND METHOD OF MAKING

CROSS-REFERENCE TO RELATED APPLICATIONS

This application is a continuation application which claims priority to U.S. patent application Ser. No. 12/248,306 filed on Oct. 9, 2008. U.S. patent application Ser. No. 12/248,306 claims the benefit of Provisional Application Ser. No. 60/992,788 filed Dec. 6, 2007. Both of the aforementioned applications are incorporated in their entirety by reference herein.

BACKGROUND OF THE INVENTION

Disclosed herein is a blend of poly(arylene ether) and an aliphatic-aromatic polyamide.

Poly(arylene ether)/aliphatic polyamide compositions are widely used and the characteristics of the compositions are a result of, at least in part, the characteristics of the poly(arylene ether) and the polyamide. Despite their wide use compositions employing aliphatic polyamides can suffer from drawbacks such as undesirably low dimensional stability, and high moisture absorption. Attempts have been made to improve the physical property profile by altering the polyamide structure to include aromatic elements to form an aliphatic-aromatic polyamide. However forming blends with poly(arylene ether) and some aliphatic-aromatic polyamides has proved problematic. Some aliphatic-aromatic polyamide can only be processed at temperatures above the degradation temperature of poly(arylene ether). Other aliphatic-aromatic polyamides have low reactivity, making the formation of a blend with stable morphology problematic. Poly(arylene ether)/polyamide compositions have a multiphasic morphology and the distribution of the disperse phase has an impact on the physical properties of the composition. One solution has been to use aliphatic-aromatic polyamides with an amine end group content greater than 45 micromoles per gram of polyamide. However, this approach is limited to these materials and there remains a need in the art for poly(arylene ether)/aliphatic-aromatic polyamide compositions formed from aliphatic-aromatic polyamides regardless of amine end group content and methods of making such compositions.

BRIEF DESCRIPTION OF THE INVENTION

The needs discussed above have been addressed by a thermoplastic composition comprising:
a compatibilized blend of a poly(arylene ether), an aliphatic-aromatic polyamide and a polymeric compatibilizer; and
an impact modifier;
wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine.

Also described herein is a thermoplastic composition produced by melt blending:
an aliphatic-aromatic polyamide;
a poly(arylene ether) wherein a portion of the poly(arylene ether) is functionalized poly(arylene ether);
an impact modifier; and
a polymeric compatibilizer having an average of greater than or equal to 3 epoxy groups per molecule;
wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine.

Also described herein is a thermoplastic composition produced by melt blending:
an aliphatic-aromatic polyamide;
a poly(arylene ether);
an impact modifier;
a functionalizing agent; and
a polymeric compatibilizer having an average of greater than or equal to 3 epoxy groups per molecule,
wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine.

Methods for preparing the compositions and articles comprising the compositions are also described.

DETAILED DESCRIPTION OF THE INVENTION

Figure 1:
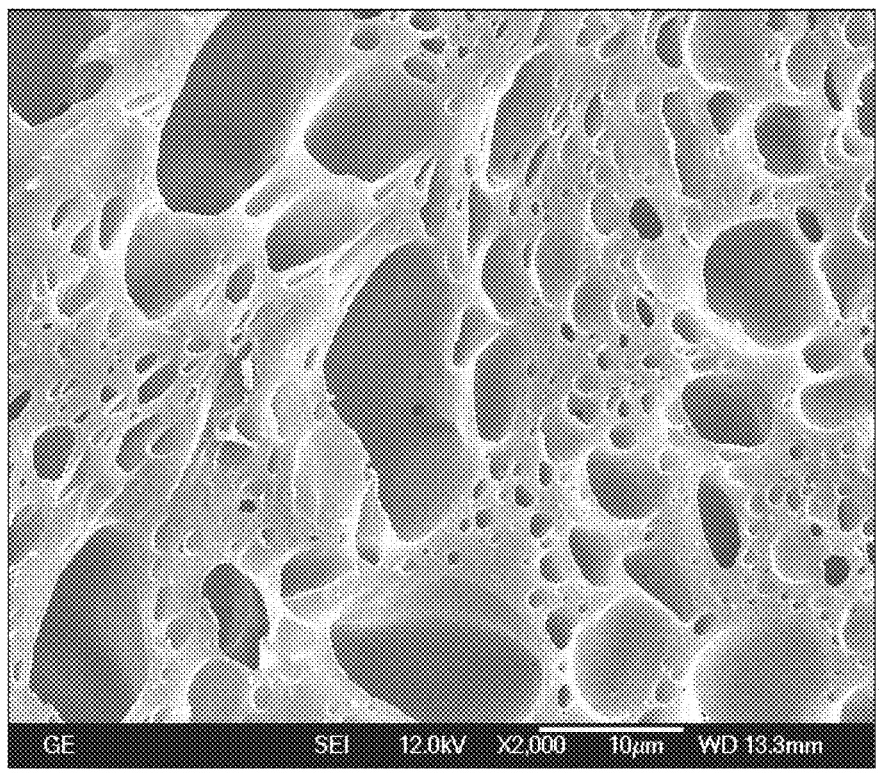
FIGS. 1 to 9 are scanning electron micrographs of Examples 1 to 9.

In the specification and the claims, reference will be made to a number of terms, which shall be defined to have the following meanings. The terms "first," "second," and the like, "primary," "secondary," and the like, "(a)," "(b)" and the like, as used herein do not denote any order, quantity, or importance, but rather are used to distinguish one element from another. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments. The singular forms "a", "an" and "the" include plural referents unless the context clearly dictates otherwise. "Optional" or "optionally" means that the subsequently described event or circumstance may or may not occur, and that the description includes instances where the event occurs and instances where it does not. Notched Izod values and nominal strain at break values described herein are determined at 23° C. Poly(arylene ether) domain size ranges and domain mean sizes described herein are based on the measurements of 50 or more poly(arylene ether) domains.

It has now been discovered that compatibilized blends of poly(arylene ether) and aliphatic-aromatic polyamide can be made using a polymeric compatibilizer having epoxy groups. The compatibilized blend can be made using an aliphatic-aromatic polyamide having an amine end group content less than 45 micromoles per gram of polyamide. This is surprising as it was previously believed that an amine end group content greater than 45 micromoles per gram of polyamide was necessary for forming a compatibilized blend, particularly in compositions free of reinforcing fillers. Without being bound by theory it is believed that because the polymeric compatibilizer comprises a reactive group (epoxy) that can react with either an amine end group or an acidic end group the use of the polymeric compatibilizer allows for the formation of compatibilizing amounts of a variety of copolymers, resulting in compatibilization of the immiscible poly(arylene ether) and polyamide.

The thermoplastic compositions described herein can have poly(arylene ether) domains with a size of 0.25 to 5 micrometers. In some embodiments the poly(arylene ether) domains have a mean domain size of 0.5 to 3 micrometers. In some embodiments the standard deviation of the mean domain size is less than 2.0. Less than or equal to 3%, or, more specifically, less than or equal to 1% of the poly(arylene ether) domains are greater than or equal to 5 micrometers. This is in comparison to comparable compositions free of the polymeric compatibilizer which have poly(arylene ether) domain sizes of 1 to 12 micrometers, a mean domain size of 1.5 to 7 micrometers with a standard deviation greater than 2, and greater than 10% of the poly(arylene ether) domains are greater than or equal to 5 micrometers.

Additionally, the poly(arylene ether) domain size of the thermoplastic compositions described herein is stable and in some embodiments shows less than or equal to a 10% increase after annealing at 310° C. for 8 minutes. Poly (arylene ether) domain size can be determined as described in the Examples below.

The thermoplastic compositions described herein have a notched Izod impact strength at 23° C. that is greater than or equal to 5 kilojoules per square meter as determined by ISO 180/A. Additionally, the thermoplastic compositions can have an elongation at break greater than or equal to 9% as determined by ISO 527.

Poly(arylene ether) comprises repeating structural units of formula (I)

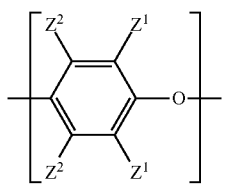

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as "substituted", it can contain heteroatoms over and above the carbon and hydrogen members of the substituent residue. Thus, when specifically described as substituted, the hydrocarbyl residue can also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it can contain heteroatoms within the backbone of the hydrocarbyl residue.

The poly(arylene ether) can comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising two or more of the foregoing polymers. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

A portion of the poly(arylene ether) can be functionalized with a polyfunctional compound (functionalizing agent) as described below. The poly(arylene ether) can be functionalized prior to making the composition or can be functionalized as part of making the composition. Furthermore, prior to functionalization the poly(arylene ether) can be extruded, for example to be formed into pellets. It is also possible for the poly(arylene ether) to be melt mixed with other additives that do not interfere with functionalization. Exemplary additives of this type include flame retardants, flow promoters, and the like.

In some embodiments the poly(arylene ether) can comprise 0.1 weight percent weight percent to 90 weight percent of structural units derived from a functionalizing agent, based on the total weight of the poly(arylene ether). Within this range, the poly(arylene ether) can comprise less than or equal to 80 weight percent, or, more specifically, less than or equal to 70 weight percent of structural units derived from functionalizing agent, based on the total weight of the poly (arylene ether).

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s has an initial intrinsic viscosity of 0.1 to 0.60 deciliters per gram (dl/g), as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art the viscosity of the poly(arylene ether) may be up to 30% higher after melt mixing. The percentage of increase can be calculated by (final intrinsic viscosity−initial intrinsic viscosity)/initial intrinsic viscosity. Determining an exact ratio, when two initial intrinsic viscosities are used, will depend somewhat on the exact intrinsic viscosities of the poly(arylene ether) used and the ultimate physical properties that are desired.

The poly(arylene ether) is present in an amount of 5 to 60 weight percent based on the total weight of the composition. Within this range the poly(arylene ether) may be present in an amount greater than or equal to 10 weight percent, or, more specifically, greater than or equal to 15 weight percent.

The aliphatic-aromatic polyamide comprises units derived from one or more dicarboxylic acid and units derived from one or more diamine. 60 to 100 mol % of the dicarboxylic acid units, based on the total moles of dicarboxylic acid units, are derived from terephthalic acid. Within this range the amount of terephthalic acid units may be greater than or equal to 75 mol %, or, more specifically, greater than or equal to 90 mol %. The polyamide is also known as 9T.

Examples of other dicarboxylic acid units that may be used in addition to the terephthalic acid units include units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. These can be used singly or in combinations of two or more types. In some embodiments the content of these other dicarboxylic acid units in the dicarboxylic acid units (a) is less than or equal to 25 mol %, or, more specifically, less than or equal to 10 mol %. Units derived from polyfunctionalized carboxylic acids such as trimellitic acid, trimesic acid and pyromellitic acid may also be included to the extent that melt molding of the composition is still possible.

The aliphatic-aromatic polyamide comprises units derived from one or more diamines. 60 to 100 mol % of the diamine units, based on the total moles of diamine units, are derived from 1,9-nonanediamine units, 2-methyl-1,8-octanediamine units, or a combination thereof. Within this range the amount of 1,9-nonanediamine units, 2-methyl-1,8-octanediamine units, or combination thereof may be greater than or equal to 75 mol %, or, more specifically, greater than or equal to 90 mol %.

The molar ratio of the 1,9-nonanediamine units to the 2-methyl-1,8-octanediamine units may be 100:0 to 20:80, or, more specifically, 100:0 to 50:50, or, even more specifically, 100:0 to 50:40. This can be referred to as the N/I ratio.

Examples of other diamine units that may be used in addition to the 1,9-nonanediamine units and/or 2-methyl-1,8-octanediamine units include units derived from linear aliphatic diamines such as 1,6-hexanediamine, 1,7-heptanediamine, 1,8-octanediamine, 1,10-decanediamine, 1,11-undecanediamine and 1,12-dodecanediamine; branched aliphatic diamines such as 2-methyl-1,5-pentanediamine, 3-methyl-1,5-pentanediamine, 2,2,4-trimethyl-1,6-hexanediamine, 2,4,4-trimethyl-1,6-hexanediamine and 5-methyl-1,9-nonanediamine; alicyclic diamines such as cyclohexanediamine, methylcyclohexanediamine, isophoronediamine, bis(4-aminocyclohexyl)methane, norbornanedimethylamine and tricyclodecanedimethylamine; and aromatic diamines such as p-phenylenediamine, m-phenylenediamine, m-xylylenediamine, p-xylylenediamine, 4,4'-diaminodiphenylsulfone and 4,4'-diaminodiphenyl ether. These can be used singly or in combinations of two or more types. In some embodiments, units derived from 1,6-hexanediamine, 1,7-heptanediamine, 1,8-octanediamine, 1,10-decanediamine and/or 1,12-dodecanediamine are combined with the 1,9-nonanediamine units, 2-methyl-1,8-octanediamine units, or combination thereof.

The aliphatic-aromatic polyamide can be manufactured by any known method for manufacturing crystalline polyamides. For example, it can be manufactured by solution polymerization or interfacial polymerization in which an acid chloride and a diamine are used as raw materials, or by melt polymerization, solid-phase polymerization, or melt extrusion polymerization in which a dicarboxylic acid and a diamine are used as raw materials.

The intrinsic viscosity of the aliphatic-aromatic polyamide, measured in concentrated sulfuric acid at 30° C., may be 0.4 to 3.0 dl/g, or, more specifically, 0.5 to 2.0 dl/g, or, even more specifically, 0.6 to 1.8 dl/g.

The melt viscosity of the aliphatic-aromatic polyamide may be 300 to 3500 poise at a shear rate of $1000\ s^{-1}$ and a temperature of 330° C., as measured by capillary viscometry. Within this range, the melt viscosity may be greater than or equal to 325, or, more specifically, greater than or equal to 350 poise. Also within this range, the melt viscosity may be less than or equal to 3300, or, more specifically, less than or equal to 3100 poise.

The aliphatic-aromatic polyamide can have an amine end group content less than or equal to 45 micromoles per gram of polyamide. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based the volume of HCl solution added to the sample, the volume of HCl used for the blank, the molarity of the HCl solution and the weight of the polyamide sample. It is explicitly contemplated that an aliphatic-aromatic polyamide having an amine end group content greater than 45 micromoles per gram of polyamide could also be used successfully in the compositions described herein.

The compatibilized blend may additionally comprise an aliphatic polyamide such as nylon 6, 6/6, 6/69, 6/10, 6/12, 11, 12, 4/6, 6/3, 7, 8, 6T, modified 6T, polyphthalamides (PPA), and combinations of two or more of the foregoing.

The composition may contain aliphatic-aromatic polyamide in an amount of 35 weight percent to 80 weight percent based on the total weight of the composition. Within this range the amount of aliphatic-aromatic polyamide may be greater than or equal to 37, or, more specifically, greater than or equal to 38 weight percent. Also within this range the amount of aliphatic-aromatic polyamide may be less than or equal to 70, or, more specifically, less than or equal to 60 weight percent.

The compatibilized poly(arylene ether)/aliphatic-aromatic polyamide blend is formed using a functionalizing agent. When used herein, the expression "functionalizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/aliphatic-aromatic polyamide blend" refers to those compositions which have been physically and/or chemically compatibilized with a polymeric compatibilizing agent and a functionalizing agent.

The functionalizing agent comprises a polyfunctional compound that is one of two types. The first type has in the molecule both (a) a carbon-carbon double bond and (b) at least one carboxylic acid, anhydride, epoxy, imide, amide, ester group or functional equivalent thereof. Examples of such polyfunctional compounds include maleic acid; maleic anhydride; fumaric acid; maleic hydrazide; dichloro maleic anhydride; and unsaturated dicarboxylic acids (e.g. acrylic acid, butenoic acid, methacrylic acid, t-ethylacrylic acid, pentenoic acid). In some embodiments, the functionalizing agent comprises maleic anhydride and/or fumaric acid.

The second type of polyfunctional functionalizing agent compounds are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, anhydride, acid halide anhydride, ester, orthoester, amide, imido, amino, and salts thereof. Typical of this type of functionalizing agents are the aliphatic polycarboxylic acids, acid esters and acid amides represented by the formula:

$(R^{I}O)_m R(COOR^{II})_n (CONR^{III}R^{IV})_s$ wherein R is a linear or branched chain saturated aliphatic hydrocarbon having 2 to 20, or, more specifically, 2 to 10 carbon atoms; $R^I$ is hydrogen or an alkyl, aryl, acyl or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein $(OR^I)$ is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid; including the various commercial forms thereof, such as for example, the anhydrous and hydrated acids; and combinations comprising one or more of the foregoing. In some embodiments, the functionalizing agent comprises citric acid. Illustrative of esters useful herein include, for example, acetyl citrate and mono- and/or distearyl citrates and the like. Suitable amides useful herein include, for example, N,N'-diethyl citric acid amide; N-phenyl citric acid amide; N-dodecyl citric acid amide; N,N'-didodecyl citric acid amide and N-dodecyl malic acid. Derivates include the salts thereof, including the salts with amines and the alkali and alkaline metal salts. Exemplary suitable salts include calcium malate, calcium citrate, potassium malate, and potassium citrate.

The foregoing functionalizing agents may be added directly to the melt blend or pre-reacted with either or both the poly(arylene ether) and polyamide. In some embodiments, at least a portion of the functionalizing agent is pre-reacted, either in the melt or in a solution of a suitable solvent, with all or a part of the poly(arylene ether). It is believed that such pre-reacting may cause the functionalizing agent to react with the polymer and, consequently, functionalize the poly (arylene ether). For example, the poly(arylene ether) may be pre-reacted with maleic anhydride, fumaric acid and/or citric acid to form an anhydride and/or acid functionalized poly (arylene ether) which has improved compatibility with the polyamide compared to a non-functionalized poly(arylene ether).

The amount of the functionalizing agent used will be dependent upon the specific functionalizing agent chosen and the specific polymeric system to which it is added.

In some embodiments, the functionalizing agent is employed in an amount of 0.05 to 2.0 weight percent, based on the total weight of the composition. Within this range the amount of functionalizing agent may be greater than or equal to 0.1, or, more specifically, greater than or equal to 0.2 weight percent. Also within this range the amount of functionalizing agent may be less than or equal to 1.75, or, more specifically, less than or equal to 1.5 weight percent.

The composition also comprises an impact modifier. In many embodiments the impact modifier resides primarily in the poly(arylene ether) phase. Examples of suitable impact modifiers include block copolymers; elastomers such as polybutadiene; random copolymers such as ethylene vinyl acetate (EVA); and combinations comprising two or more of the foregoing impact modifiers.

Exemplary block copolymers include A-B diblock copolymers and A-B-A triblock copolymers having one or two blocks A, which comprise structural units derived from an alkenyl aromatic monomer, for example styrene; and a rubber block, B, which generally comprises structural units derived from a diene such as isoprene or butadiene. The diene block may be partially hydrogenated. Mixtures of these diblock and triblock copolymers are especially useful.

Suitable A-B and A-B-A copolymers include, but are not limited to, polystyrene-polybutadiene; polystyrene-poly(ethylene-butylene); polystyrene-polyisoprene; polystyrene-poly(ethylene-propylene); poly(alpha-methylstyrene)-polybutadiene; poly(alpha-methylstyrene)-poly(ethylene-butylene); polystyrene-polybutadiene-polystyrene (SBS); polystyrene-poly(ethylene-butylene)-polystyrene (SEBS); polystyrene-polyisoprene-polystyrene; polystyrene-poly (ethylene-propylene)-polystyrene; poly(alpha-methylstyrene)-polybutadiene-poly(alpha-methylstyrene); as well as selectively hydrogenated versions thereof, and the like, as well as combinations comprising two or more of the foregoing impact modifiers. Such A-B and A-B-A block copolymers are available commercially from a number of sources, including Phillips Petroleum under the trademark SOLPRENE, Kraton Polymers, under the trademark KRATON, Dexco under the trademark VECTOR, and Kuraray under the trademark SEPTON The impact modifier can be present in an amount of 5 weight percent to 22 weight percent, based on the total weight of the composition. Within this range, the impact modifier may be present in an amount greater than or equal to 8 weight percent, or, more specifically, greater than or equal to 10 weight percent. Also within this range, the impact modifier may be present in an amount less than or equal to 20 weight percent, or, more specifically, less than or equal to 18 weight percent, or, even more specifically, less than or equal to 16 weight percent. The exact amount and types or combinations of impact modifiers utilized will depend in part on the requirements needed in the final blend composition and may be determined by those skilled in the art.

In addition to the poly(arylene ether), aliphatic-aromatic polyamide, and impact modifier, the composition is made using a polymeric compatibilizer having an average of greater than or equal to 3 epoxy groups per molecule. In some embodiments the polymeric compatibilizer has an average of greater than or equal to 6 epoxy groups per molecule, or, more specifically, an average of greater than or equal to 8 epoxy groups per molecule or, more specifically, an average of greater than or equal to 10 epoxy groups per molecule. As used herein and throughout, a polymeric compatibilizer is a polymeric polyfunctional compound that interacts with the poly(arylene ether), the aliphatic-aromatic polyamide, or both. This interaction may be chemical (e.g. grafting) and/or physical (e.g. affecting the surface characteristics of the disperse phases). When the interaction is chemical, the compatibilizer may be partially or completely reacted with the poly (arylene ether), aliphatic-aromatic polyamide, or both such that the composition comprises a reaction product. For example, the epoxy groups may react with acid groups present on the aliphatic-aromatic polyamide, the functional groups on the functionalized poly(arylene ether), or both during melt blending. Use of the polymeric compatibilizer can improve the compatibility between the poly(arylene ether) and the aliphatic-aromatic polyamide, as may be evidenced by enhanced impact strength, mold knit line strength, elongation and/or the formation of a distinctive two phase morphology. Such morphology is evidenced by the occurrence of two distinct phases within a molded part; a continuous phase comprising aliphatic-aromatic polyamide and a disperse phase comprising poly(arylene ether). The disperse phase domains can have a mean domain size of 0.5 to 3 micrometers. The average domain diameter is the average circular diameter of at least 50 domain and may be determined by scanning electron microscopy or by transmission electron microscopy. In the case of elliptical domains "circular diameter" is the mean of the major and minor axis of each domain. In other words, the diameters of the circumcircle and incircle are averaged for each elliptical domain.

Illustrative examples of suitable compatibilizers include, but are not limited to, copolymers of glycidyl methacrylate (GMA) with alkenes, copolymers of GMA with alkenes and acrylic esters, copolymers of GMA with alkenes and vinyl acetate, copolymers of GMA and styrene. Suitable alkenes comprise ethylene, propylene, and mixtures of two or more of the foregoing. Suitable acrylic esters comprise alkyl acrylate monomers, including, but not limited to, methyl acrylate, ethyl acrylate, propyl acrylate, butyl acrylate, and combinations of the foregoing alkyl acrylate monomers. When present, the acrylic ester may be used in an amount of 15 weight percent to 35 weight percent based on the total amount of monomer used in the copolymer. When present, vinyl acetate may be used in an amount of 4 weight percent to 10 weight percent based on the total amount of monomer used in the copolymer. Illustrative examples of suitable compatibilizers comprise ethylene-glycidyl acrylate copolymers, ethylene-glycidyl methacrylate copolymers, ethylene-glycidyl methacrylate-vinyl acetate copolymers, ethylene-glycidyl methacrylate-alkyl acrylate copolymers, ethylene-glycidyl methacrylate-methyl acrylate copolymers, ethylene-glycidyl methacrylate-ethyl acrylate copolymers, and ethylene-glycidyl methacrylate-butyl acrylate copolymers.

The composition comprises 0.1 weight percent to 20 weight percent of polymeric compatibilizer, based on the total weight of the composition. Within this range, the composition can comprise less than or equal to 15 weight percent, or, more specifically less than or equal to 10 weight percent, or, even more specifically, less than or equal to 8 weight percent compatibilizer. Also within this range, the composition may comprise greater than or equal to 0.5 weight percent, or, more specifically, greater than or equal to 1 weight percent polymeric compatibilizer.

The foregoing polymeric compatibilizer may be added directly to the composition or pre-reacted with either or both of the poly(arylene ether) and aliphatic-aromatic polyamide, as well as with other materials employed in the preparation of the composition. The initial amount of the compatibilizer used and order of addition will depend upon the specific compatibilizer chosen and the specific amounts of poly (arylene ether) and aliphatic-aromatic polyamide employed.

The composition may optionally comprise electrically conductive filler. The electrically conductive filler may be any filler that increases the electrical conductivity of the molded composition. Suitable electrically conductive fillers may be fibrous, disc-shaped, spherical or amorphous and include, for example, conductive carbon black; conductive carbon fibers, including milled fibers; conductive vapor-grown carbon fibers, and various mixtures thereof. Other electrically conductive fillers which can be used are metal-coated carbon fibers; metal fibers; metal disks; metal particles; metal-coated disc-shaped fillers such as metal-coated talcs, micas and kaolins; and the like. In some embodiments the electrically conductive fillers include carbon black, carbon fibers, and mixtures thereof, an illustrative example of which includes material available commercially from Akzo Chemical under the trademark Ketjen black EC600JD. In some embodiments, carbon black includes conductive carbon blacks having average particle sizes of less than 200 nanometers, or, more specifically, less than 100 nanometers, or, even more specifically, less than 50 nanometers. Conductive carbon blacks may also have surface areas greater than 200 square meters per gram ($m^2/g$), or, more specifically, greater than 400 $m^2/g$, or, even more specifically greater than 1000 $m^2/g$. Conductive carbon blacks may also have a pore volume (as measured by dibutyl phthalate absorption) of greater than 40 cubic centimeters per 100 grams ($cm^3/100\,g$), or, more specifically, greater than 100 $cm^3/100\,g$, or, even more specifically, greater than 150 $cm^3/100\,g$. Conductive carbon blacks may also have a volatiles content less than 2 weight percent. Useful carbon fibers include the graphitic or partially graphitic vapor-grown carbon fibers having diameters of 3.5 to 500 nanometers, or, more specifically, diameters of 3.5 to 70 nanometers, or, even more specifically, diameters of 3.5 to 50 nanometers. Representative carbon fibers are the vapor-grown carbon fibers, such as those available from Hyperion, and double wall and single wall nanotubes such as those available from Carbon Nanotechnologies Incorporated (CNI). Conductive fillers of this type are described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Generally, the electrically conductive filler will be present in an amount of 0.2 weight percent to 20 weight percent based on the total weight of the composition. The amount will depend on the nature of the conductive filler. For example, when the conductive filler is conductive carbon black, the amount can be 1 to 10 weight percent, or, more specifically, 1 to 8 weight percent, or, even more specifically, 1.4 to 7 weight percent. When the conductive filler is a vapor-grown carbon fiber, the amount can be 0.2 to 6 weight percent, or, more specifically, 0.5 to 4 weight percent based on the total weight of the composition. Conductive filler amounts less than the above lower limits often fail to provide adequate conductivity, while amounts greater than the above upper limits may tend to make the final blend brittle.

The composition may also comprise additives known in the art. Possible include anti-oxidants, dyes, pigments, colorants, stabilizers, flame retardants, drip retardants, crystallization nucleators, metal salts, antistatic agents, plasticizers, lubricants, and combinations comprising two or more of the foregoing additives. These additives are known in the art, as are their effective levels and methods of incorporation. Effective amounts of the additives vary widely, but they are usually present in an amount of less than or equal to 50 weight percent, based on the total weight of the composition. Amounts of these additives are generally 0.25 weight percent to 2 weight percent, based upon the total weight of the composition. The effective amount can be determined by those skilled in the art without undue experimentation.

The composition may also comprise fillers as known in the art. Fillers may include reinforcing fillers. Exemplary fillers include small particle minerals (e.g., clay, mica, talc, and the like), glass fibers, nanoparticles, organoclay, and the like and combinations comprising one or more of the foregoing fillers. Fillers are typically used in amounts of 5 weight percent to 50 weight percent, based on the total weight of the composition.

The composition can be prepared using various techniques, including batch or continuous techniques that employ kneaders, extruders, mixers, and the like. For example, the composition can be formed as a melt blend employing a twin-screw extruder. In some embodiments at least some of the components are added sequentially. For example, the poly(arylene ether), the impact modifier, and functionalizing agent may be added to the extruder at the feed throat or in feeding sections adjacent to the feed throat, while the aliphatic-aromatic polyamide and polymeric compatibilizer, may be added to the extruder in a subsequent feeding section downstream. When a functionalized poly(arylene ether) is used the functionalized poly(arylene ether) and impact modifier may be added to the extruder at the feed throat or in feeding sections adjacent to the feed throat, while the aliphatic-aromatic polyamide and polymeric compatibilizer may be added to the extruder in a subsequent feeding section downstream. A vacuum system may be applied to the extruder, prior to the second sequential addition, to generate a sufficient vacuum to lower the residual levels of non-reacted functionalizing agent and any other volatile materials. In an alternative embodiment, the sequential addition of the components may be accomplished through multiple extrusions. A composition may be made by preextrusion of selected components, such as the poly(arylene ether), the impact modifier and the functionalizing agent to produce a pelletized mixture. A second extrusion may then be employed to combine the preextruded components with the remaining components. The electrically conductive filler, when used, can be added as part of a masterbatch or directly. The masterbatch or the electrically conductive filler can be added either at the feedthroat or down stream. The extruder may be a two lobe or three lobe twin screw extruder. It is contemplated that a three lobe extruder may yield a composition with significantly higher notched Izod and nominal strain at break values when compared to compositionally identical compositions made using a two lobe twin screw extruder.

The thermoplastic composition may be used in a variety of articles such as high-heat connectors used in computers, laptops, cell phones, flat panel TVs, and other electronic devices, connectors used in automotive applications such as wire harnesses, and wire connectors, vertical and horizontal automotive body panels, throttle bodies, pressure sensors, and fuel pumps. Fluid handling applications can include water meters, hydro-blocks, and high pressure valves/fittings. Compositions comprising electrically conductive filler can be powder coated.

Without further elaboration, it is believed that one skilled in the art can, using the description herein, make and utilize the composition to its fullest extent. The following examples are included to provide additional guidance to those skilled in the art in practicing the claimed composition. The examples provided are merely representative of the work that contributes to the teaching of the composition. Accordingly, these examples are not intended to limit the invention, as defined in the appended claims, in any manner.

EXAMPLES

Compositions described herein were typically extruded on a 23 millimeter (mm) co-rotating intermeshing twin-screw extruder. The components of the compositions and their source are listed in Table 1. Unless otherwise specified, the functionalized poly(arylene ether), antioxidants, and impact modifier were added at the feed throat of the extruder and the aliphatic-aromatic polyamide and polymeric compatibilizer were added downstream. The extruder was set with barrel temperatures of 80° C. to 310° C. with the screw rotating at 300 rotations per minute (rpm) with a vacuum of approximately 250 millibars (mbar) applied to the melt during compounding. The torque was maintained at 60-65%. All examples were made using a three lobe extruder.

All samples were molded via injection molding with the molding machine set at 80-325° C. and mold set at 100° C., and tested for notched Izod impact strength (in units of kilojoules per square meter; $kJ/m^2$) according to ISO 180/1A. The elongation modulus (E-modulus in units of gigaPascals; GPa) and elongation at break (in %) were tested according to ISO 527. For scanning electron microscopy studies a JEOL field emission scanning electron microscope was employed at an operating voltage of 20 kilovolts. For domain size and distribution typically the sample was faced with a diamond knife on the microtome. The dispersed phase was solution etched and then the sample was gold coated to render it conducting. Toluene was used as the etching solvent and etching was performed for about a minute. All micrographs were recorded in the imaging mode at a magnification of 2000×. The domain sizes were determined by Clemex Vision software.

The component amounts of each of the compositions are shown in Tables 2-6, along with physical properties of molded test parts. The amount of each component is expressed in weight percent based on the total weight of the composition.

TABLE 1

| Component | Trade name and Supplier |
|---|---|
| PPE I | A poly(2,6-dimethyl-1,4-phenylene ether) having intrinsic viscosity of 0.46 dl/g available from GE Plastics. |
| PPE I-FA | Prepared by extruding 2% by weight fumaric acid with PPE I |
| PPE I-CA | Prepared by extruding 2% by weight citric acid with PPE I. |
| PA 9T | An aliphatic-aromatic polyamide having an amine end group content of 10 meq/kg of polyamide available from Kuraray. |
| SEBS | Polystyrene-poly(ethylene-butylene)-polystyrene available as KRATON 1651 from KRATON Polymers. |
| BF E | A polymeric compatibilizer available as BONDFAST E from Sumitomo Chemicals and having an epoxy content around 900 meq/kg and a number average molecular weight (Mn) of 19,000. The compatibilizer has an average of 17 pendant epoxy groups per molecule (avg epoxy groups = 17) |
| J 4368 | A polymeric compatibilizer available as Joncryl 4368 from Johnson Polymers having an epoxy content around 3500 meq/kg and an Mn of 6800. The compatibilizer has an average of 24 pendant epoxy groups per molecule (avg epoxy groups = 24). |
| FA | Fumaric acid from Pfaltz and Bauer. |
| CA | Citric acid from SD Fine Chemicals Ltd |

Examples 1-4

The compositions and physical properties of Examples 1-4 are shown below in Table 2. In example 2 the polyamide and the polymeric compatibilizer were added at the feedthroat with the other components.

TABLE 2

|  | 1* | 2 | 3 | 4 |
|---|---|---|---|---|
| PPE I | 46.96 | — | — | — |
| PPE I-FA | — | 47.9 | 47.9 | 47.9 |
| FA | 0.5 | — | — | — |
| SEBS | 6.0 | 6.0 | 6.0 | 6.0 |
| PA 9T | 45.86 | 41.5 | 43.5 | 41.5 |
| BF E | — | 4.0 | 2.0 | 4.0 |
| E modulus (GPa) | 2.4 | 2.1 | 2.3 | 2.1 |
| Elongation at break (%) | 5.1 | 23.0 | 21.0 | 28.0 |
| Notched Izod (kJ/m$^2$) | 3.8 | 10.3 | 10.9 | 9.0 |
| VST (° C.) | 210.4 | 204.2 | 204.5 | 203.3 |

*Comparative Example

Figure 2:
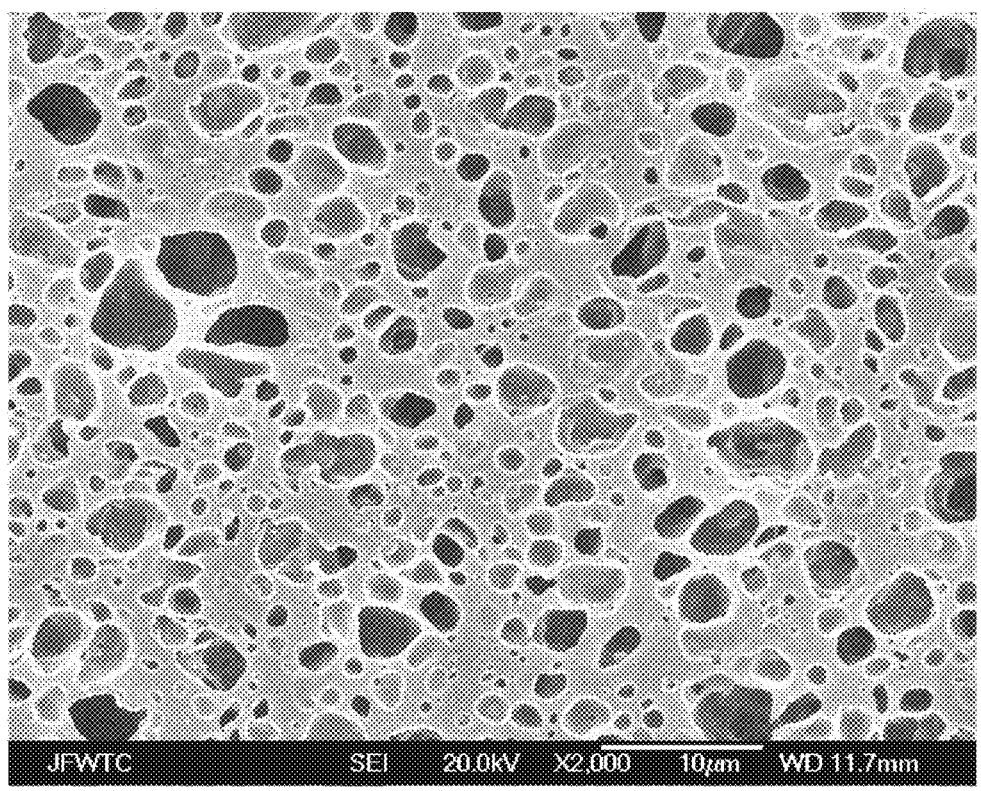
Figure 3:
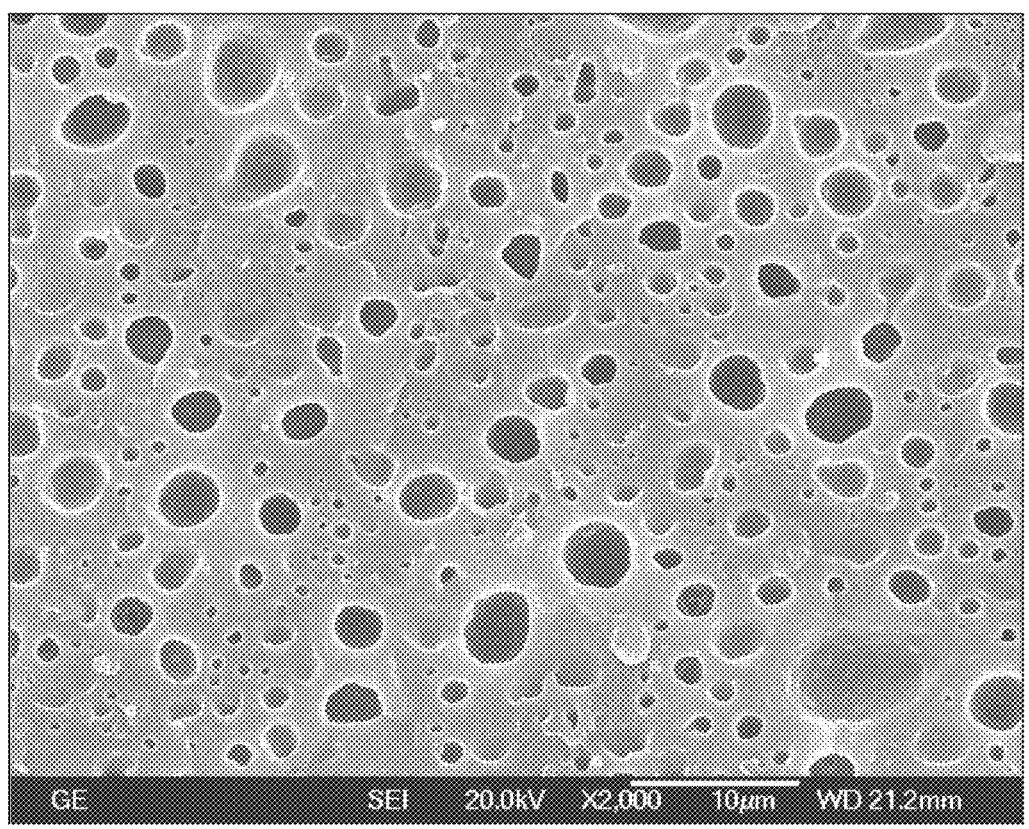
Figure 4:
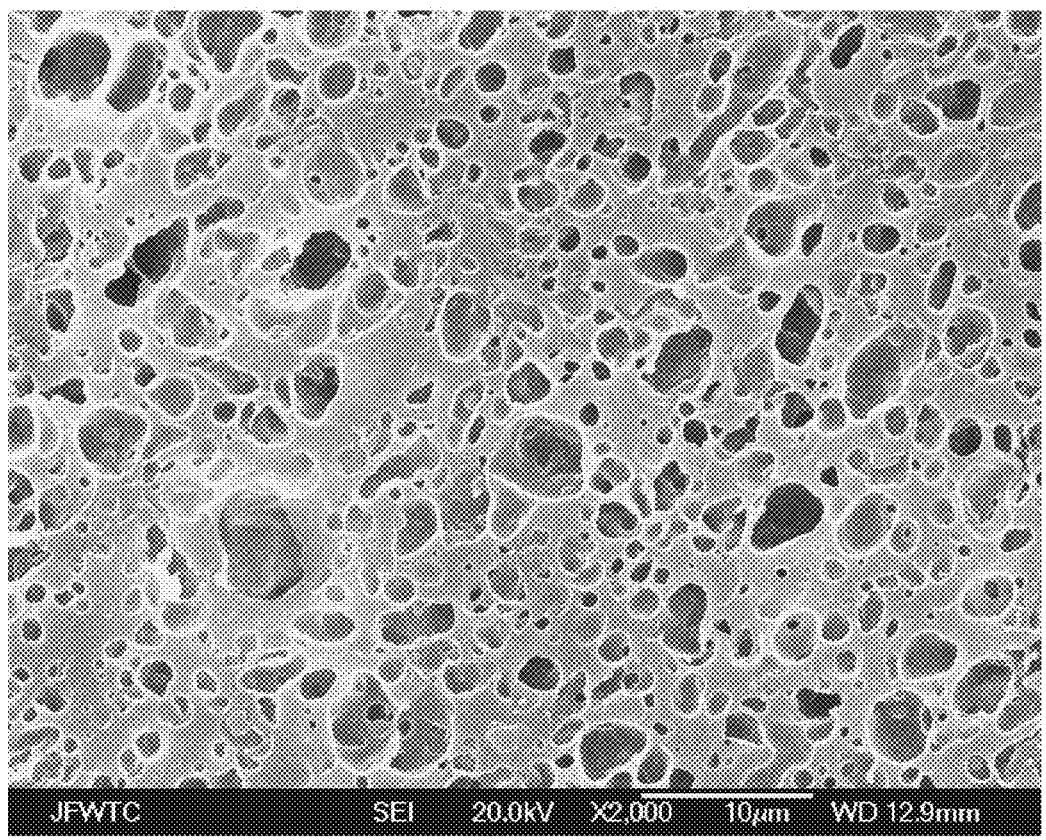
Figure 10:
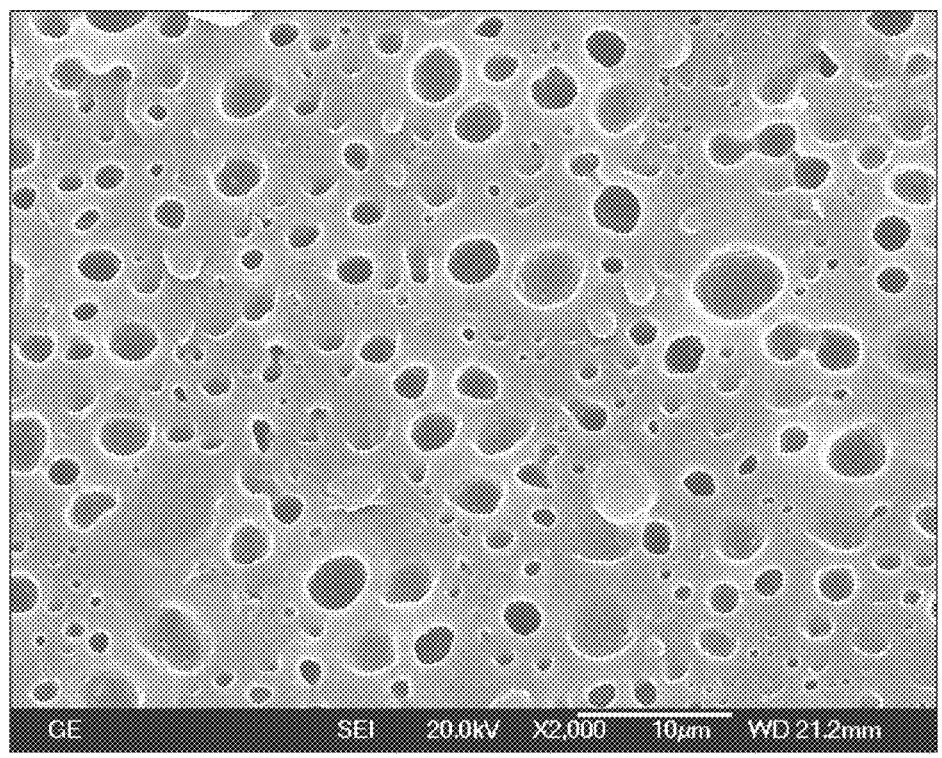
FIG. 10 is a scanning electron micrograph of Example 3 after annealing.

Use of the epoxy functionalized polyolefin (BF E) (Examples 2-4) as the polymeric compatibilizer resulted in a marked improvement in physical properties when compared to Example 1 which did not contain a polymeric compatibilizer. Notably, the elongation at break improved by over 300% and the Notched Izod impact strength improved by at least 100%. The morphologies of these blends are shown in the figures. FIG. 1 is a micrograph of Example 1. Analysis of the image showed that the dispersed poly(arylene ether) phase had domain sizes of 1-12 micrometers with a mean domain size of 3.2 micrometers. Greater than 20% of the poly(arylene ether) domains were greater than or equal to 5 micrometers in size. FIGS. 2, 3 and 4 are micrographs of Examples 2, 3, and 4 respectively. Analysis of the images showed that the dispersed poly(arylene ether) phase had domain sizes of 0.25 to 5 micrometers with a mean domain size of 1.2 to 1.9 micrometers. Less than 1% of the poly(arylene ether) domains in Examples 2, 3, and 4 were greater than or equal to 5 micrometers in size. FIG. 10 is a micrograph of Example 3 after annealing for 8 minutes at 310° C.

Examples 5-6

The compositions and physical properties of Examples 1, 5 and 6 are shown below in Table 3. Example 1 is shown again for convenience.

TABLE 3

|  | 1* | 5 | 6 |
|---|---|---|---|
| PPE I | 46.96 | — | — |
| PPE I-CA | — | 47.9 | 47.9 |
| FA | 0.5 | — | — |
| SEBS | 6.0 | 6.0 | 6.0 |
| PA 9T | 45.86 | 41.5 | 43.5 |
| BF E | — | 4.0 | 2.0 |
| E modulus (GPa) | 2.4 | 2.2 | 2.2 |
| Elongation at break (%) | 5.1 | 10.8 | 11.3 |
| Notched Izod (kJ/m$^2$) | 3.8 | 9.0 | 5.2 |
| VST (° C.) | 210.4 | 199.1 | 200.3 |

*Comparative example

Similar to the examples in Table 2, the use of a polymeric compatibilizer results in significant improvement in the physical properties of the composition when compared to Example 1. Examples 5 and 6 show at least 100% improvement in elongation at break and at least 50% improvement in Notched Izod impact strength.

Figure 5:
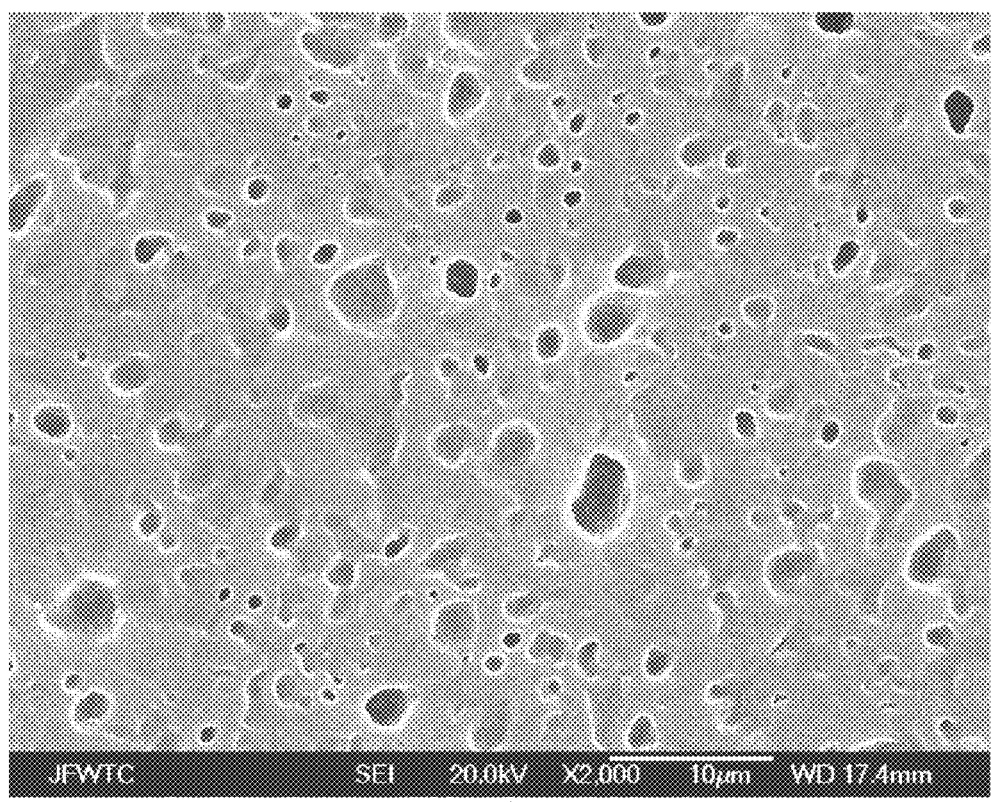
Figure 6:
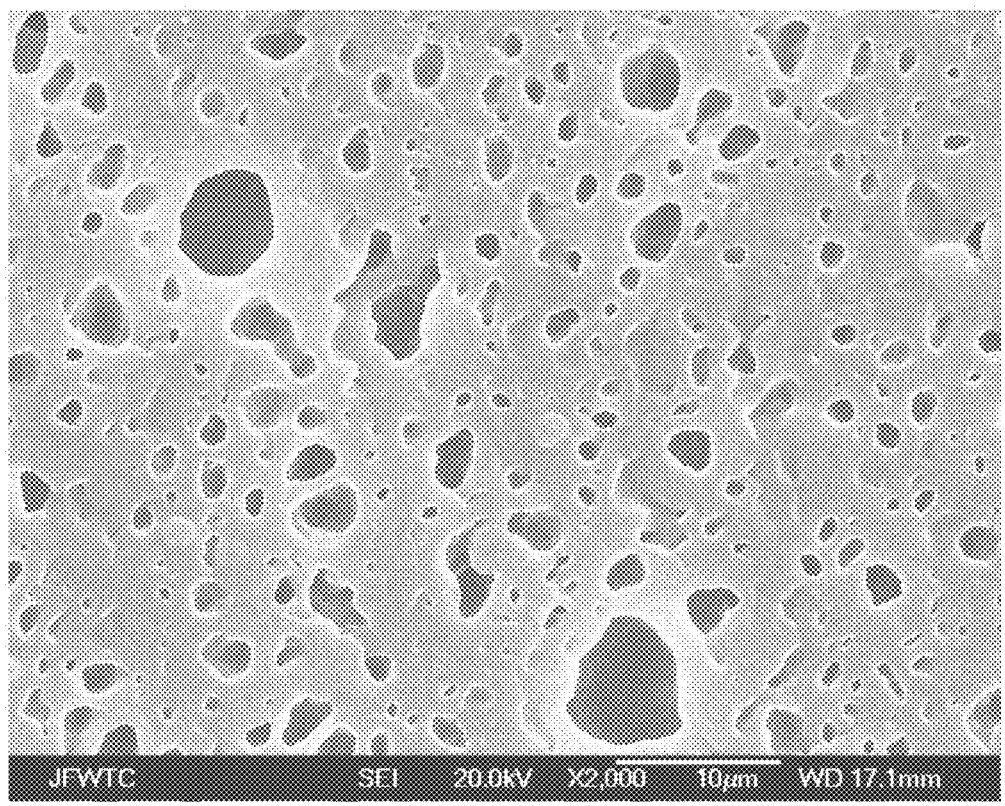

FIGS. 5 and 6 are micrographs showing the morphology of Examples 5 and 6 respectively. Analysis of the images showed that the poly(arylene ether) mean domain size was 1 to 2 micrometers. Less than 3% of the poly(arylene ether) domains were greater than or equal to 5 micrometers in size.

Examples 7-9

The compositions and physical properties of Examples 1 and 7 to 9 are shown below in Table 4. Example 1 is shown again for convenience. In example 7 the polyamide and the polymeric compatibilizer were added at the feedthroat with the other components.

TABLE 4

|  | 1* | 7 | 8 | 9 |
|---|---|---|---|---|
| PPE I | 46.96 | — | — | — |
| PPE I-FA | — | 47.9 | 48.5 | 48.5 |
| FA | 0.5 | — | — | — |
| SEBS | 6.0 | 6.0 | 6.0 | 6.0 |
| PA 9T | 45.9 | 45.0 | 45.2 | 45.0 |
| J 4368 | — | 0.5 | 0.3 | 0.5 |
| E modulus (GPa) | 2.4 | 2.4 | 2.4 | 2.4 |
| Elongation at break (%) | 5.1 | 11.9 | 15.0 | 9.5 |
| Notched Izod (kJ/m$^2$) | 3.8 | 10.2 | 7.3 | 9.5 |
| VST (° C.) | 210.4 | 206.3 | 206.6 | 206.0 |

*Comparative example

Examples 7 to 9 show that use of an epoxy functionalized poly(alkenyl aromatic) resin (Joncryl 4368) as the polymeric compatibilizer has a similar effect on physical properties and morphology as the epoxy functionalized polyolefin (BF E) shown above.

Figure 7:
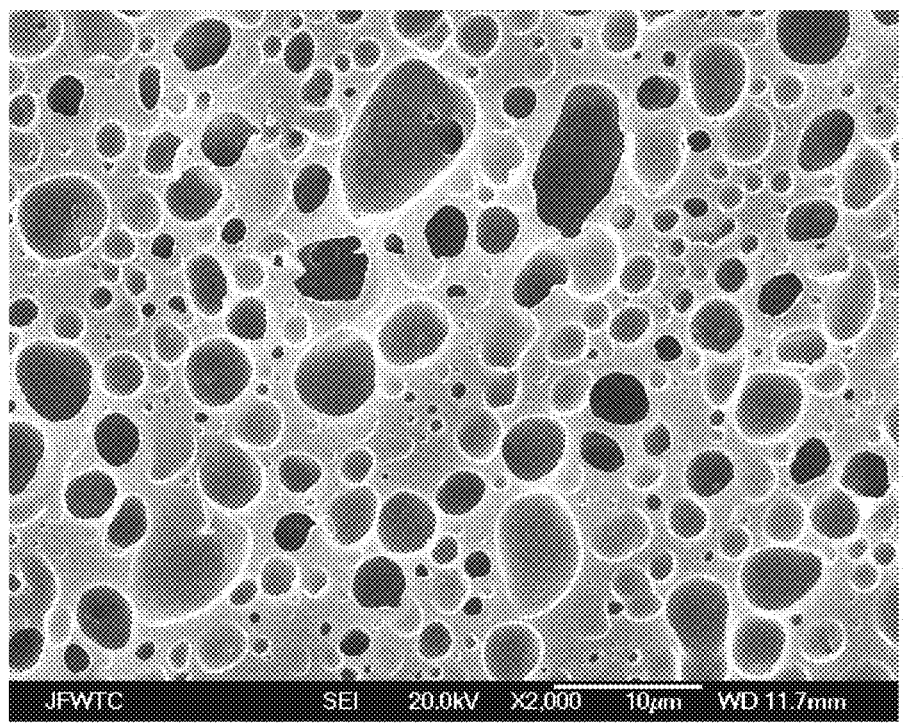
Figure 8:
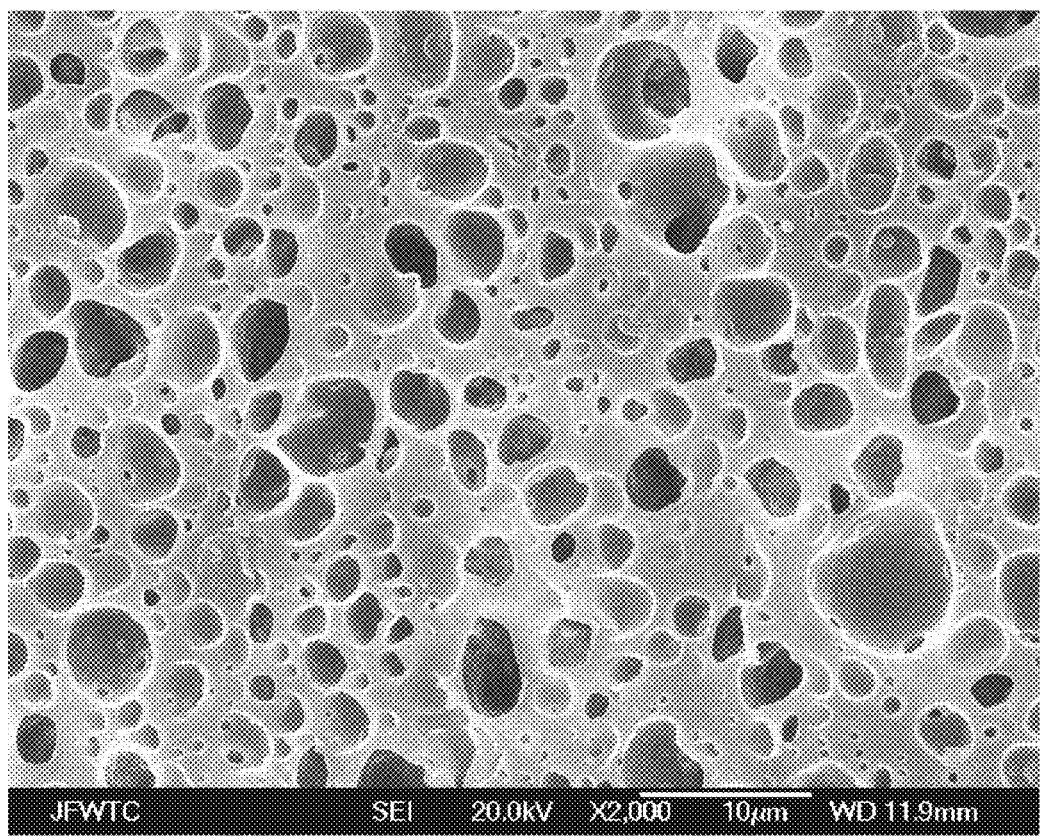
Figure 9:
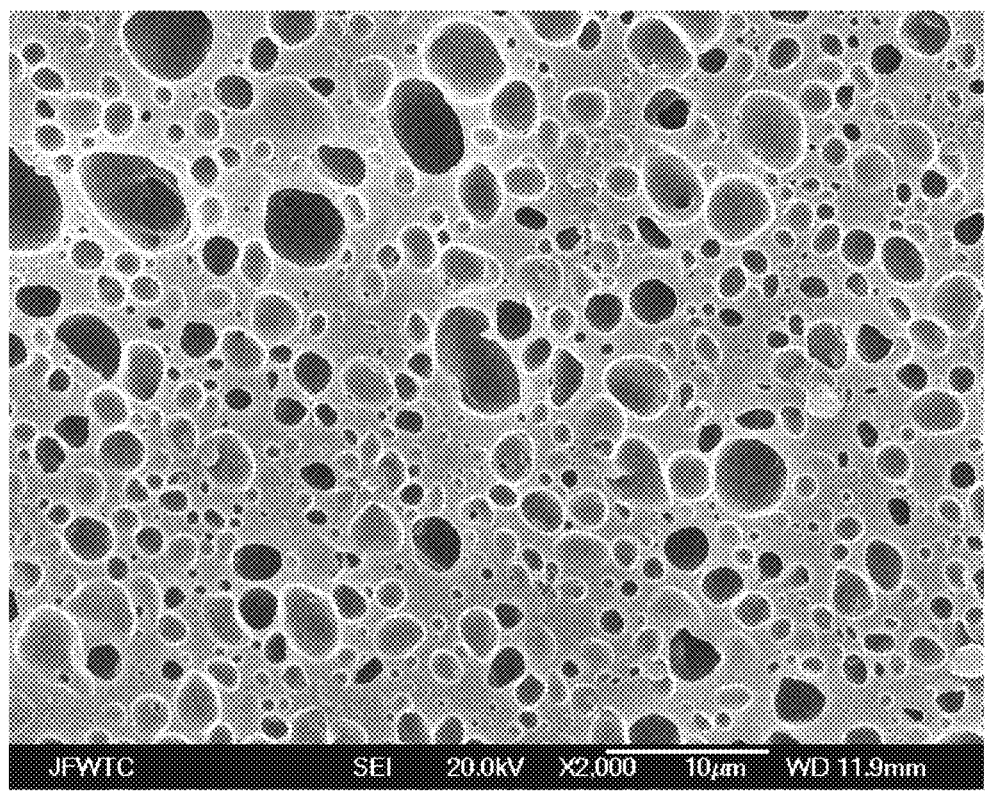

FIGS. 7 to 9 are micrographs showing the morphology of Examples 7 to 9 respectively. Examples 7 to 9 had a poly(arylene ether) mean domain size of 1.3 to 1.9 micrometers. Less than 1% of the poly(arylene ether) domains were greater than 5 micrometers.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A thermoplastic composition comprising:
    a compatibilized blend of a poly(arylene ether), an aliphatic-aromatic polyamide and a polymeric compatibilizer; and
    an impact modifier;
    wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine and the polymeric compatibilizer comprises a copolymer of glycidyl methacrylate and alkene, a copolymer of glycidyl methacrylate, alkene and acrylic ester, a copolymer of glycidyl methacrylate, alkenes and vinyl acetate, a copolymer of glycidyl methacrylate and styrene or a combination of the foregoing.

2. The thermoplastic composition of claim 1, wherein the composition comprises a dispersed phase and a continuous phase and the dispersed phase comprises poly(arylene ether) and has a mean domain size of 0.5-3 micrometers.

3. The thermoplastic composition of claim 1, wherein the aliphatic-aromatic polyamide, prior to forming the composition, has an amine end group less than 45 micromoles per gram of polyamide.

4. The thermoplastic composition of claim 1, wherein the poly(arylene ether) is present in an amount of 5 to 60 weight percent, the aliphatic-aromatic polyamide is present in an amount of 35 to 80 weight percent, the impact modifier is present in an amount of 5 to 22 weight percent, and the polymeric compatibilizer is present in an amount of 0.1 to 20 weight percent, based on the total weight of the composition.

5. A thermoplastic composition produced by melt blending:
    an aliphatic-aromatic polyamide;
    a poly(arylene ether);
    an impact modifier;
    a functionalizing agent; and
    a polymeric compatibilizer having an average of greater than or equal to 3 epoxy groups per molecule,
    wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine and the polymeric compatibilizer comprises a copolymer of glycidyl methacrylate and alkene, a copolymer of glycidyl methacrylate, alkene and acrylic ester, a copolymer of glycidyl methacrylate, alkenes and vinyl acetate, a copolymer of glycidyl methacrylate and styrene or a combination of the foregoing.

6. The thermoplastic composition of claim 1, wherein the composition has a notched Izod impact strength at 23° C. that is greater than or equal to 5 kilojoules per square meter as determined by ISO 180/A and an elongation at break greater than or equal to 9% as determined by ISO 527.

7. The thermoplastic composition of claim 1, wherein the composition further comprises reinforcing filler, electrically conductive filler or a combination thereof.

8. A thermoplastic composition produced by melt blending:
    an aliphatic-aromatic polyamide;
    a poly(arylene ether) wherein a portion of the poly(arylene ether) is functionalized poly(arylene ether);
    an impact modifier; and
    a polymeric compatibilizer having an average of greater than or equal to 3 epoxy groups per molecule;
    wherein the aliphatic-aromatic polyamide is composed of units derived from a dicarboxylic acid and units derived from a diamine and the units derived from a dicarboxylic acid comprise 60 to 100 mol % of units derived from terephthalic acid and the units derived from a diamine comprise 60 to 100 mol % of units derived from 1,9-nonanediamine, 2-methyl-1,8-octanediamine, or a combination of 1,9-nonanediamine and 2-methyl-1,8-octanediamine and the polymeric compatibilizer comprises a copolymer of glycidyl methacrylate and alkene, a copolymer of glycidyl methacrylate, alkene and acrylic ester, a copolymer of glycidyl methacrylate, alkenes and vinyl acetate, a copolymer of glycidyl methacrylate and styrene or a combination of the foregoing.

9. The thermoplastic composition of claim 8, wherein the composition comprises a dispersed phase and a continuous phase and the dispersed phase comprises poly(arylene ether) and has a mean domain size of 0.5-3 micrometers.

10. The thermoplastic composition of claim 8, wherein the aliphatic-aromatic polyamide, prior to forming the composition, has an amine end group less than 45 micromoles per gram of polyamide.

11. The thermoplastic composition of claim 8, wherein the poly(arylene ether) is present in an amount of 5 to 60 weight percent, the aliphatic-aromatic polyamide is present in an amount of 35 to 80 weight percent, the impact modifier is present in an amount of 5 to 22 weight percent, and the polymeric compatibilizer is present in an amount of 0.1 to 20 weight percent, based on the total weight of the composition.

12. The thermoplastic composition of claim 5, wherein the poly(arylene ether) is present in an amount of 5 to 60 weight percent, the aliphatic-aromatic polyamide is present in an amount of 35 to 80 weight percent, the impact modifier is present in an amount of 5 to 22 weight percent, and the polymeric compatibilizer is present in an amount of 0.1 to 20 weight percent, based on the total weight of the composition.

13. The thermoplastic composition of claim 8, wherein the composition has a notched Izod impact strength at 23° C. that is greater than or equal to 5 kilojoules per square meter as determined by ISO 180/A and an elongation at break greater than or equal to 9% as determined by ISO 527.

14. The thermoplastic composition of claim 8, wherein the composition further comprises reinforcing filler, electrically conductive filler or a combination thereof.

15. The thermoplastic composition of claim 5, wherein the functionalizing agent comprises fumaric acid, maleic anhydride, citric acid or a combination of two or more of the foregoing.

16. The thermoplastic composition of claim 5, wherein the composition comprises a dispersed phase and a continuous phase and the dispersed phase comprises poly(arylene ether) and has a mean domain size of 0.5-3 micrometers.

17. The thermoplastic composition of claim 5, wherein the aliphatic-aromatic polyamide, prior to forming the composition, has an amine end group less than 45 micromoles per gram of polyamide.

18. The thermoplastic composition of claim 5, wherein the composition further comprises reinforcing filler, electrically conductive filler or a combination thereof.

* * * * *